Patented Jan. 15, 1929.

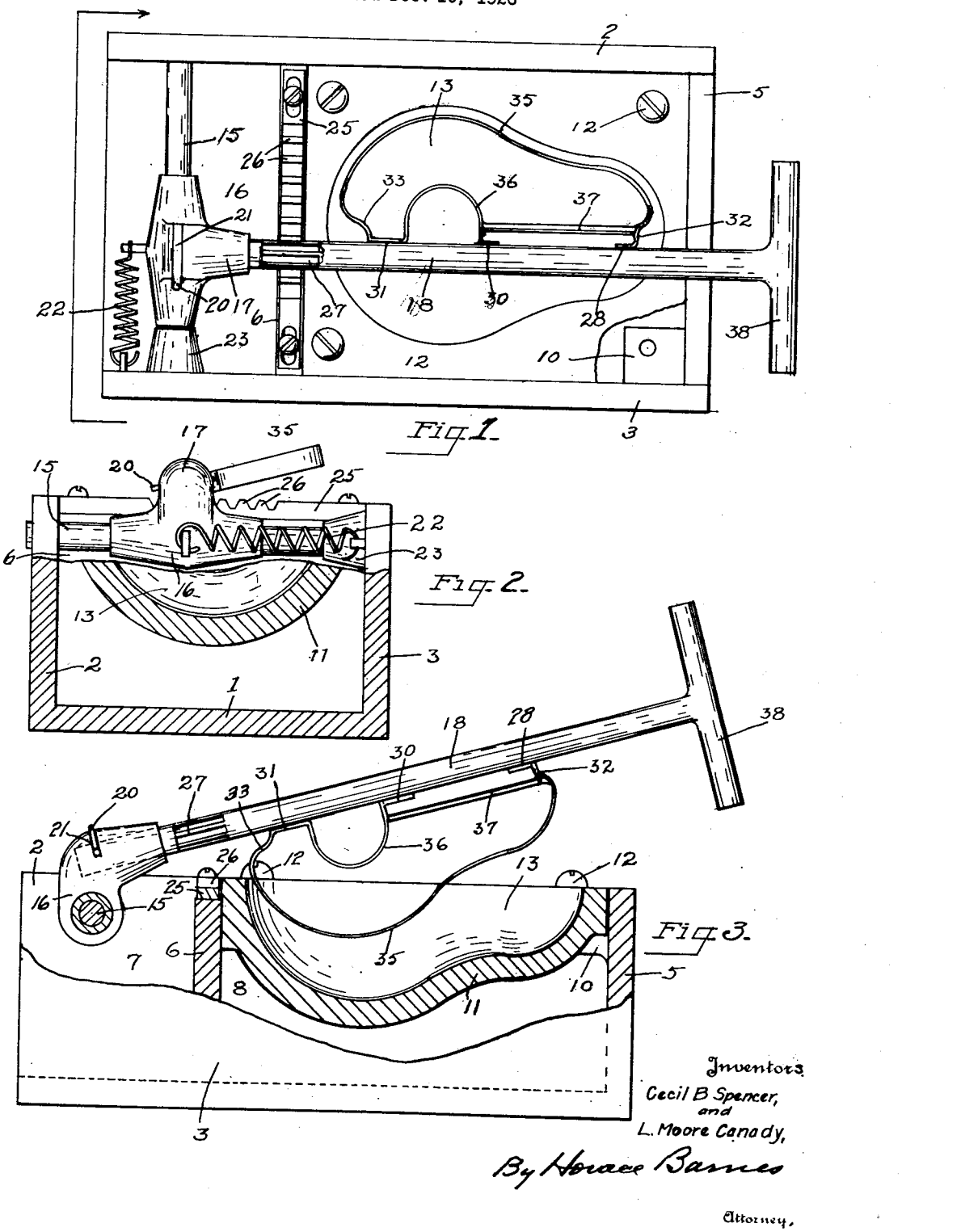

1,699,034

UNITED STATES PATENT OFFICE.

CECIL B. SPENCER AND L. MOORE CANADAY, OF ALBANY, OREGON.

DEVICE FOR PEELING AND CORING PEARS.

Application filed December 10, 1926. Serial No. 153,759.

This invention relates to improvements in devices for peeling and coring fruits such as pears, and particularly to the apparatus described and claimed in our prior application Serial No. 140,259, filed October 8, 1926.

The object of our present invention is to provide a device of simple and economical construction for severing the peeling and core from a half-section of fruit at one operation.

A further object of the invention is the provision of actuating means for causing the knives that peel and core the fruit to be oscillated about an axis substantially conforming to the center of the fruit being peeled, so that a cutting stroke of the knives for a full half-circle will be effected.

A still further object of the invention is the provision of knives of improved arrangement and design for severing the peeling and blossom end of the pear, together with the core and stem, at one operation.

Other objects and advantages of our invention, and objects relating to details of construction and novel arrangement of parts therein, will be readily apparent in the course of the detailed description to follow.

The accompanying drawings illustrate by way of example an embodiment of our invention, in which:

Figure 1 is a plan view thereof.

Fig. 2 is a view partly in end elevation and partly in transverse section.

Fig. 3 is a view partly in side elevation and partly in longitudinal section.

Referring to said views, the reference numeral 1 indicates the bottom of a rectangular cast metal frame, and 2 and 3 designate vertical side walls thereof. An end wall 5 is provided, and an interior vertical wall 6 of integral construction dividing the interior of said frame into compartments 7 and 8. Brackets 10 are formed in the corners of the chamber 8, upon which a tray 11 is rigidly mounted through screws 12. Said tray is formed with a receptacle 13 conforming to a half-section of the pear or other fruit to be operated upon.

A transversely disposed circular bar 15 is rigidly mounted in the chamber 7 upon which a head 16 is mounted for sliding movements longitudinally of the bar and rocking movements pivotally of the bar. Said head is formed with a hub 17 having an axial bore in which an end of the shaft 18 is socketed for rotary movements as limited by a pin 20 extending from said bar into a slot 21 of said head. A coil spring 22 is secured at one end to the head and its other end to the side wall 3 of the frame to yieldingly retain the head toward one side of the frame as limited by a stop 23.

Upon the upper edge of the wall 6 a rack bar 25 is rigidly secured having a plurality of rack teeth 26 formed thereon with which pinion teeth 27 formed about the shaft 18 may be engaged, with the effect of moving the shaft laterally of the frame through the sliding connection of the head 16 on the bar 15 in opposition to the spring 22.

A strip of steel is secured at its ends 28 and 30 to the shaft 18 and again in alignment therewith, as at 31. Adjacent the connections 28 and 31 of said strip with the shaft it is indented, as at 32 and 33, for the purpose of trimming out the stem end and the blossom end of the pear, respectively, and between such connections, as at 35, said strip is formed to follow the configuration of the interior surface of the receptacle 13 and in spaced relation therefrom to the approximate thickness of the peeling to be removed from the fruit.

Between the secured portions 31 and 30 of said strip, as at 36, it is formed in a substantially semi-circular configuration for the purpose of removing the core of the fruit. Secured to the portions 32 and 36 of said strip and spaced from said shaft in a line parallel thereto is a steel strip 37 for the purpose of removing the stem from the fruit. Said strips are formed with one of their edges sharpened to afford knifelike cutting edges. The end of said shaft opposite to its connection in the head 16 is formed with a handle 38.

The operation of our invention may be described as follows: With the shaft tilted upwardly on its pivotal connection with the bar 15, half-sections of pears as the fruit to be operated upon are placed within the receptacle 13 to the size of which the pears are graded. The shaft is then lowered with the knife blades extending in a horizontal plane over the pear section, as indicated in Fig. 1, and in such position the shaft 18 will lie upon one side of the longitudinal axis of the receptacle 13 and the pear therewithin, while the cutting portions of the knives will lie upon the opposite side of said axial line.

The shaft is then rotated through the operator turning the handle 38 to cause the knives to cut into the pear with a circular motion, cutting away the waste portions of the fruit from the body thereof and leaving the latter free of all imperfections and each piece thereof cut to uniform standard size. When the shaft has been lowered upon the fruit into cutting position the pinion teeth 27 will be brought into mesh with the rack teeth 26 and in the process of turning the shaft such engagement will cause the shaft to travel in irregular motion across the axis of the receptacle so that when the finish of the cutting stroke is attained and the knives are again in horizontal position the shaft will be in the same relative position upon the opposite side of said axial line as originally.

Through these means the shaft may lie horizontally in its cutting position with its periphery resting upon the top edge of the wall 5 and in contact with the pear section, filling the receptacle 13 flush with its upper edge, and the cutting edges of the knives will enter and emerge from the pear section at the beginning and end of its cutting stroke cleanly and without tearing any of the fruit, and the axis of rotation of the knives will be maintained approximately at the periphery of the shaft instead of in the axis of the shaft as would be the case with a non-movable shaft.

The slot 21 is substantially semi-circular so that the pin 20 engaging at its opposite extremities admits of a semi-circular movement of the shaft and a stop at each end thereof. When the finish of the cutting stroke is reached, the operator will rock the shaft upwardly on the bar 15, disengaging the pinion from the rack, whereupon the spring 22 will assert itself to return the head and shaft to its original position while the operator turns the shaft and knives back to their original cutting position while removing the fruit just treated and inserting a fresh section in place thereof.

The trays 11 are readily removable, as well as the shaft 18, which, together with the knives mounted thereon, are formed in counterparts so that where pears of other sizes are being operated upon a quick substitution may be made to the desired size and pattern. While the cutting operation is being made, the pear section may be held in the receptacle in opposition to the pressure of the knives by the operator's left hand pressing down upon the fruit upon the left hand side of the shaft.

Having described our invention, what we claim, is:

1. Fruit peeling devices of the class described, consisting in a frame having a receptacle therein to receive a half-section of fruit, a shaft mounted in said frame for rocking and rotary movements, and a knife mounted upon said shaft arranged to operatively engage said fruit in the rotary movements of the shaft.

2. Fruit peeling devices of the class described, consisting in a frame having a receptable therein to receive a half-section of fruit, a horizontally disposed bar in said frame, a shaft pivotally mounted upon said bar for rocking movements and arranged for rotary motion, and a knife secured to said shaft and operatively engageable with the fruit contained in said receptacle.

3. Fruit peeling devices of the class described, consisting in a frame provided with a receptacle to receive a half-section of fruit therein, a horizontally disposed bar in said frame, a head pivotally mounted upon said bar, and a shaft rotatably supported in said head having a plurality of knives mounted thereon to operatively engage the fruit contained within said receptacle.

4. Fruit peeling devices of the class described, consisting in a frame provided with a receptacle to receive a half-section of fruit, a horizontally disposed bar in said frame, a head slidably mounted longitudinally of said bar and pivotally movable thereon, and a shaft rotatably supported in said head having a plurality of knives mounted thereon operatively engageable with the fruit contained within said receptable.

5. Fruit peeling devices of the class described, consisting in a frame provided with a receptacle to receive a half-section of fruit, a horizontally disposed bar in said frame, a head slidably mounted longitudinally of said bar and pivotally movable thereon, a rack-bar mounted in said frame, a shaft rotatably supported in said head having a plurality of pinion-teeth formed about its periphery engageable with said rack-bar, and a plurality of knives mounted upon said shaft and operatively engageable with the fruit contained within said receptacle.

6. Fruit peeling devices of the class described, consisting in a frame having a receptacle to receive a half-section of fruit, a shaft mounted for rotary and sliding movements of said frame, co-operating means upon said frame and said shaft to control the sliding movements of the shaft, and a plurality of knives mounted on said shaft.

7. Fruit peeling devices of the class described consisting in a frame having a receptacle to receive a half-section of fruit, a bar horizontally disposed in said frame, a head slidable upon said bar and arranged for rotary movements thereon, a spring tending to yieldingly maintain said head at one end of said bar, a shaft rotatable in said head, a rack-bar mounted in said frame, said shaft having pinion-teeth about its periphery engageable with said rack-bar, and a plurality of knives on said shaft.

8. In fruit peeling devices of the class described a rotatably mounted shaft, a peeling knife secured at its opposite ends to said shaft in a radial plane, a coring knife secured to the shaft within the space formed by the peeling knife, and a stemming knife secured at its opposite ends to said peeling and soring knives and spaced from said shaft in parallel thereto.

CECIL B. SPENCER.
L. MOORE CANADAY.